United States Patent [19]

Haslop et al.

[11] 4,296,326

[45] Oct. 20, 1981

[54] WATERMARK DETECTION

[75] Inventors: John M. Haslop, Woodley; Reginald G. Knapman, Overton; Michael A. West, London, all of England

[73] Assignee: Thomas De La Rue & Company Limited, London, England

[21] Appl. No.: 127,789

[22] Filed: Mar. 5, 1980

[30] Foreign Application Priority Data

Mar. 6, 1979 [GB] United Kingdom ............... 07936/79

[51] Int. Cl.[3] ........................ G01J 1/42; G01N 21/38; B42D 15/00; G06K 9/74

[52] U.S. Cl. ................................ 250/372; 250/461 R; 283/8 R; 356/71; 356/72

[58] Field of Search .................... 250/372, 271, 461 R, 250/484, 485; 283/7, 8 R, 9 R, 57, 58, 61, 62; 356/71, 72

[56] References Cited

U.S. PATENT DOCUMENTS 3,774,046 11/1973 Hoch et al. ......................... 250/485

3,842,281 10/1974 Goodrich ........................ 250/461 R

*Primary Examiner*—Alfred E. Smith

*Assistant Examiner*—Carolyn E. Fields

*Attorney, Agent, or Firm*—Martin Novack

[57] ABSTRACT

In a method of detecting sheets which do not have a genuine watermark (i.e. watermarks which result from variations in fibre distribution introduced during manufacture) the absorption of ultra-violet radiation is measured for each sheet in the area in which the watermark is expected to be present, and the transmittance of light by this area of the sheet is also measured. Sheets for which the absorption measurement does not show a substantially constant value, and sheets for which the light-transmittance shows a substantially constant value over the said area, are rejected. The absorption measurement is preferably effected by measuring the reflectance of ultra-violet radiation by the sheet, but the transmittance of ultra-violet radiation or the fluorescence of the sheet in the presence of ultra-violet radiation can also be measured. The measured value for the area can be compared with a reference value obtained by a measurement of the same parameter outside the watermark area.

19 Claims, 9 Drawing Figures

PRINTED WATERMARK
UV. BRIGHT PAPER.

PRINTED WATERMARK
UV. DULL PAPER.

PRINTED WATERMARK
UV. BRIGHT PAPER.

PRINTED WATERMARK
UV. DULL PAPER.
(MUCH HIGHER SENSITIVITY).

WATERMARK DETECTION

This invention relates to the recognition of sheets, for example of paper, which lack predetermined characteristics associated with the presence of a watermark, and is of particular significance in sorting counterfeits from watermarked security documents.

There is a need for methods of and means for sorting counterfeit documents, which do not include a watermark or which have a simulated watermark possessing certain characteristics of a genuine watermark, from documents (including security documents such as banknotes, bonds and cheques) which incorporate genuine watermarks.

Watermarks, as correctly defined, are marks introduced into paper during its manufacture by one of two main methods; a shaped mould may be used in a cylindermould machine or a profile dandy roll may be used in a Fourdrinier machine and in both instances variations in fibre distribution are introduced in accordance with the design of the watermark. These variations in fibre distribution give rise to corresponding variations in light transmission when the document is viewed by an observer through rear illumination and these variations may also be detected by photoelectric systems. Watermarks which result from variations in fibre distribution introduced during manufacture are hereinafter collectively called "mould watermarks". Paper containing mould watermarks, particularly those made by the cylinder mould-process, is commonly used for the printing of security documents. It is known, however, to simulate such watermarks by printing upon the paper with one or more white inks, other opacifying materials and transparentizing materials; these marks (hereinafter called "simulated watermarks") may be used by printers in the manufacture of their standard products (although they are not usually used in the production of security documents) or may possibly be used by counterfeiters of security documents who do not have access to the watermarked paper used in the production of genuine security documents. In this specification such simulated watermarks, suitably distinguished where necessary from mould watermarks, are, together with mould watermarks, referred to as watermarks.

A feature of a sheet having a mould watermark is its variable light transmittance. However, this is also a feature of simulated watermarks and when counterfeiting has occured, some sheets of a batch to be sorted may have mould watermarks while others may have simulated watermarks and the appearance of the genuine and simulated watermarks may be confusingly similar. Consequently, tests related to the light transmission characteristics of watermarks on sheets are not in themselves sufficient to identify and reject the simulated watermarks. In this specification it is assumed that the area occupied by the watermark is either unprinted or overprinted only with tint or other subdued printing.

According to the present invention, a method of rejecting sheets which do not have a mould watermark comprises measuring for each sheet, in an area in which a watermark is expected to be present, the absorption of ultra-violet radiation by the sheet and also the transmittance of visible light by the sheet, and rejecting sheets for which the said absorption measurement does not show a substantially constant value and also sheets for which the said transmittance measurement shows a substantially constant transmittance of visible light over the said area.

In the preferred method embodying the invention, the reflectance of the ultra-violet radiation in the selected area is measured, preferably on each side of the sheet. In an alternative method, the transmittance of the sheet to ultra-violet radiation is measured, in which case the measurement need be carried out in one direction only. In yet a third method, the fluorescence of the sheet in the presence of ultra-violet radiation is measured, again preferably from both sides of the sheet.

Thus the invention relies in part on the fact that the opacifying and transparentizing inks used for simulated watermarks have stronger ultra-violet characteristics than paper when applied to the paper in quantity sufficient to produce a simulated watermark. The invention combines utilising the light transmittance variation produced by watermarks with using a feature which is not apparent in normal lighting, e.g. the variation in reflectance of a sheet with a simulated watermark in ultra-violet radiation. The reflectance of the base material of the sheet to ultra-violet radiation is compared with the reflectance of what has been added to the sheet (in a simulated watermark).

One of the principal uses of the present invention is in the field of detecting counterfeited security documents. We have observed that whereas genuine banknotes paper appears dull when exposed to ultra-violet radiation, counterfeit banknotes are usually printed on commercially available papers which almost invariably appear bright when exposed to ultra-violet radiation; this feature is deliberately incorporated in commercially papers by the addition during manufacture of so-called optical brightening agents. These brightening agents are not use in banknote paper manufacture.

According to a subsidiary feature of the invention, therefore, each sheet is further subjected to a measurement of the visible fluorescence of its base material in ultra-violet radiation and sheets for which the said visible fluorescence is greater than a predetermined value are rejected.

This test is preferably the first test to be carried out, so that only UV-dull sheets are affected by the second test, which is preferably the UV-reflectance test. This second test distinguishes sheets having simulated watermarks from those which do not have simulated watermarks. The remaining sheets, which are UV-dull sheets having genuine watermarks and UV-dull sheets which have no watermark at all, are sorted by the transmission test, which rejects the sheets having no watermark.

Thus, the invention provides a detection system which takes into account not only the light transmission characteristics of the watermark but also the manner of manufacture of the document, i.e. whether the watermark was incorporated during manufacture of the base material or was subsequently added; this is achieved by ascertaining the relationship between the ultra-violet absorption characteristics in different parts of the document (i.e. parts which are watermarked and parts which are not).

The invention can be carried into effect with a dynamic detection system in which there is relative movement between the document and a series of detection devices. Thus, the invention may be incorporated in a high-speed inspection and sorting system in which documents are transported along a flow line past detector heads and, in accordance with thc output signals from the detectors, the documents are sorted.

It is advantageous to render the detectors operative for the tests only for the areas of a document where a watermark is expected to be present. This can be accomplished by delaying processing signals from the detectors for a period initiated by the arrival of the leading edge of the document at a given point along a flow line.

To allow for soiling or wear, on the assumption that such soiling or wear occurs uniformly over the whole of the sheet, a portion of the document remote from the expected position of the watermark may be inspected by the detectors, the resulting measurements providing reference signals for comparison with those obtained from the same detectors in the presence of the watermarked area.

In order that the invention may be better understood, any example of a method of and means for sorting sheets will now be described with reference to the accompanying drawings. In the drawings.

Figure 1:
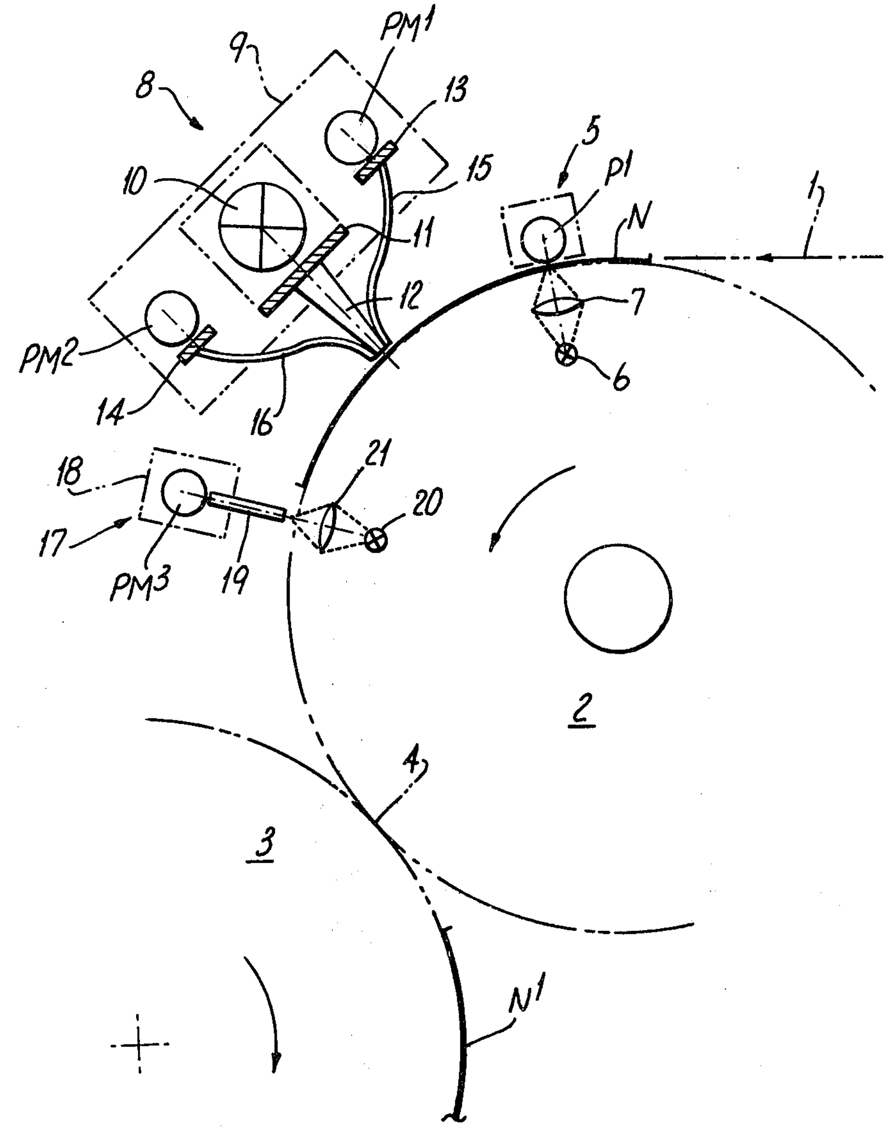
FIG. 1 is a diagrammatic plan view of the apparatus.

In FIG. 1, banknotes are removed sequentially from a supply stack by a feeding means (not shown) of known construction and are delivered in spatially timed relationship along a flow-line 1 and thence around the part peripheries of serially arranged transporter drums 2 and 3. The said drums may be of any suitable type but conveniently they include radially disposed vacuum ports in communication with a source of vacuum via stationary commutator devices so arranged that vacuum is applied to the ports during predetermined angles of rotation of the drums. Thus, in operation, a banknote is transferred from the drum 2 to the drum 3 at the common tangent 4 of the drums.

It will thus be appreciated that by providing a viewing device, or devices adjacent the drum 2, one side of a banknote N may be examined and that the reverse side thereof may be subsequently examined by a second viewing device or devices (not shown) disposed adjacent drum 3. A downstream banknote $N^1$ is shown disposed on drum 3.

It should be noted that whilst the drums 2 and 3 are referred to as single drums, they in fact each comprise a pair of axially spaced drums between which certain parts of the viewing devices may be mounted to the framework of the apparatus without impeding the flow-line.

The first viewing component of the device comprises a banknote presence detector 5 having a light source 6 and an optical system 7 disposed between the pair of drums 2, in association with a photo-detector $P^1$ disposed outwardly thereof. The detector serves to provide a trigger pulse to initiate a counter (referred to below) upon the detection of the leading edge of a banknote.

Downstream of the device 5 there is provided a second viewing component 8 comprising a housing 9 containing two measuring devices for viewing a banknote together with a source of illumination therefor. The latter comprises a 4-watt low pressure mercury lamp 10 having an external coating of a UV-emitting phosphor (320–380nm) a UV filter 11 and a tapered solid quartz light pipe 12. The light pipe is proportioned to illuminate an area 1.5 ×15 mm. of a banknote in longitudinal and transverse directions with respect to the flow-line. The said measuring devices comprise photomultipliers $PM^1$, and $PM^2$ together with associated filters 13, 14 and arrays of light guides 15, 16 respectively. The viewing ends of the light guides are arranged in ribbon formation and are mounted immediately adjacent the opposite sides of the light pipe 12, as shown, so as to view the said illuminated area. The photomultiplier $PM^1$ serves to evaluate fluorescence and is provided with a filter 13 having a 420–440 nm transmission characteristics and the light guide 15 is of glass. The photomultiplier $PM^2$ serves to evaluate UV reflectance and is provided with a filter 14 having a 350 nm transmission characteristic and the light guide 16 is of quartz to transmit UV with minimal loss.

Downstream of the housing 9 there is provided a third viewing component 17 which serves to measure white light transmitted through a banknote. This device comprises a housing 18 containing a photomultiplier $PM^3$ and an associated light guide 19 which receives illumination from a light source 20 and an optical system 21 disposed between the pair of drums 2.

The drums are synchronously driven at a constant peripheral velocity in unison with the velocity of banknotes fed along the flow-line 1 and accordingly the linear position of a banknote under test may be readily ascertained by the utilisation of length-indicative clock pulses.

Figure 2:
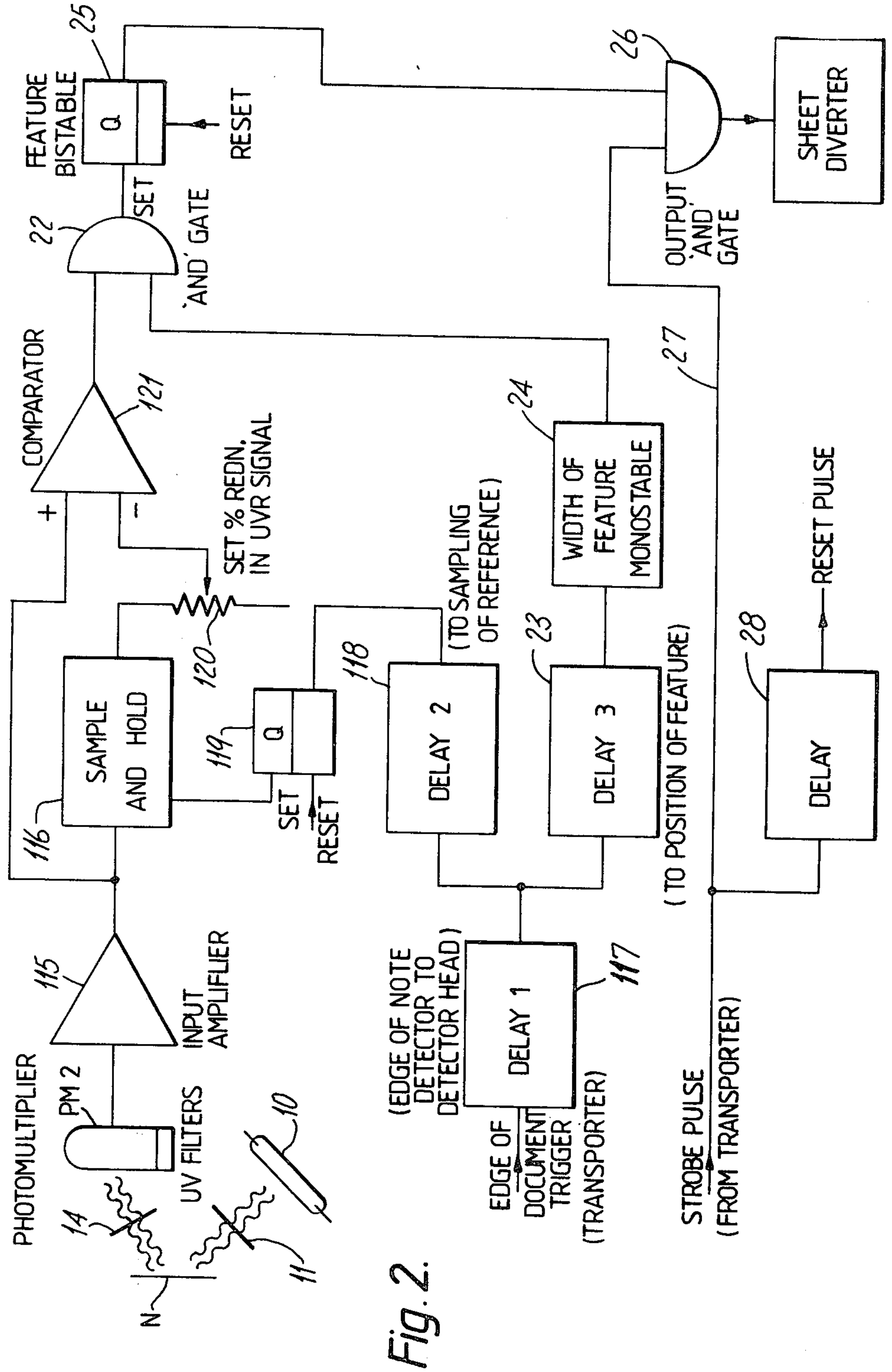
FIG. 2 is a circuit diagram for a part of the apparatus shown in FIG. 1.

A circuit suitable for the UV reflectance test is shown in FIG. 2. The photomultiplier $PM^2$ detects the ultraviolet radiation reflected by a document N on the transporter, the filter 11 having removed visible radiation from the output of the lamp 10 and the filter 14 having removed the effects of UV-induced fluorescence. The photomultiplier signal is passed through an input amplifier 115 to a sample-and-hold circuit 116 where a reference level is taken and stored. This reference level corresponds to a measurement on unprinted or evenly tinted paper and is preferably taken before the watermarked area of the document is brought to the detector position by the transporter. The timing of the sampling is controlled as follows.

The signal from the photodetector $P^1$ (FIG. 1), indicating the detection of the leading edge of a sheet, is applied to a first delay circuit 117, which delays the signal for a period equal to that required for the leading edge of the document to move from the position of the photodetector to the position of the detector head 8. The signal then passes to a second delay 118 which controls the point along the document at which a sample value is taken for reference purposes. At the end of this second delay, the signal switches a bistable circuit 119, the output of which initiates the sampling operation by the circuit 16.

The potentiometer 120 permits a proportion of the sampled signal to be applied to a comparator 121. In the comparator, it is compared with the current output of the input amplifier 115 and the difference signal passes to an AND gate 22. The initiation of the opening of the AND gate is controlled by a third delay circuit 23, which provides a delay representing the period between the leading edge of the document reaching the detector head 8 and the watermark to be detected reaching this point. A monostable circuit 24 operates in response to the signals from the third delay circuit 23 and opens the AND gate 22 for a period corresponding to the width of the watermark.

In this way, the output of the AND gate 22 is made to exist only when the watermark area is passing the detector head and then indicates the difference between the signal derived from the watermark area and the reference signal derived from another area of the document. If there is a reduction in UV reflectance over the watermarked position, greater than the preset proportion, the output of the AND gate will go high and the following bistable 25 will be set. This applies a signal to an output AND gate 26 which receives a strobe pulse along line 27, controlled from the transporter. The AND gate 26 provides a reject pulse to a sheet diverter 29.

A further delay circuit 28 responsive to the strobe pulse, resets the components of the circuit after each document has passed the detector head.

As previously explained, the photomultiplier $PM^3$ provides a signal representing the transmittance of the document. This photomultiplier is connected into a circuit similar to that of FIG. 2 and also provides a reject pulse, in this case if the output of the photomultiplier $PM^3$ is substantially constant during the passage of the area in which the watermark should be present.

The photomultiplier $PM^1$ is connected to a circuit which is simpler than that of FIG. 2 in that there are no delays for "gating" the signal from the area in which the watermark should be present. This third circuit is concerned with the fluorescence of the base paper material when subjected to ultra-violet radiation and in this case the magnitude of the reference signal is preselected by the operator. Again, a reject signal is generated if the document exhibits a high level of fluorescence.

The delays may be achieved by the use of a clock pulse generator, operating at a frequency determined by the speed of the transporter, and counters. It will be appreciated that the first delay circuits for the photomultipliers $PM^2$ and $PM^3$ will provide different delays because of the spacing between the detectors 8 and 17. Sampling, controlled by the second delay circuits, may be effected on an unprinted margin of the document, for example.

The reject signals are gated together so that a diverter is actuated or a warning signal is produced when any of the three circuits provides a reject signal.

Because in practice the position of a watermark in a document may very slightly from sample to sample, two or more transversely spaced viewing devices may be provided to ensure that at least one of the devices will traverse the intended line of scan.

Generally speaking, filters having transmission characteristics of more than 400 nm are suitable for the evaluation of the fluorescence of commonly available paper. The filter associated with the photomultiplier $PM^2$ should have a transmission characteristic below about 370 nm.

As explained above, as an alternative to or in addition to the measurement of ultra-violet reflectance in the area in which the watermark is expected, the signal from the photomultiplier $PM^1$ may also be applied to a circuit similar to FIG. 2 for comparing the fluorescence of the area which is expected to contain the watermark with the fluorescence of a sample area of the banknote to determine whether a document should be rejected.

Figure 7:
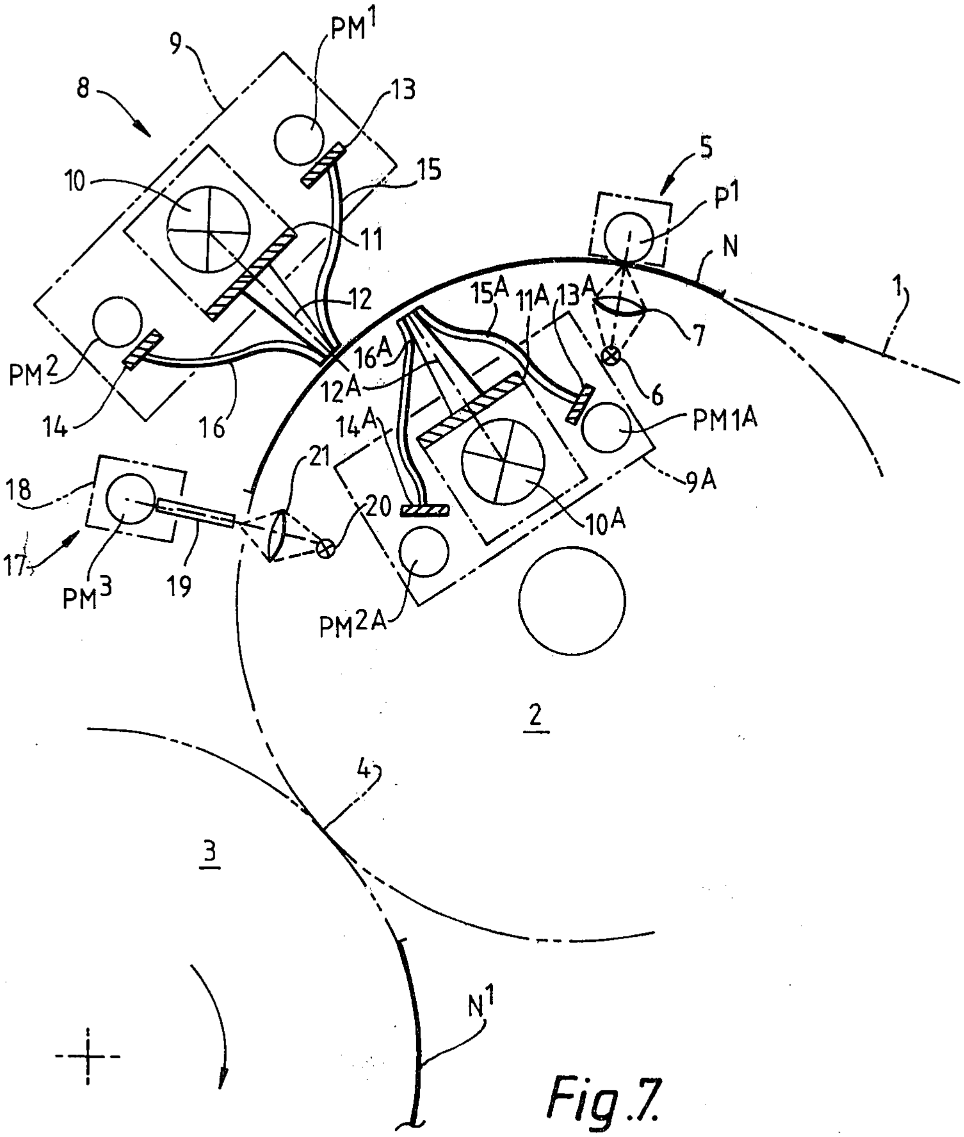
FIG. 7 is a view similar to that of FIG. 1 but showing a second lamp and photomultiplier housing scanning the other face of the sheet.

In FIG. 7, the housing 9 and its contents are duplicated on the other side of the sheet under consideration. The purpose of this is to permit two measurements of ultraviolet reflectance to be made, one from each side of the sheet, and two measurements of the fluorescence of the sheet induced by ultraviolet radiation, one from each side of the sheet. The elements 10A, 11A. 12A, 13A, 14A, 15A and 16A perform the same function as the elements 10, 11, 12, 13, 14, 15, and 16.

Figure 8:
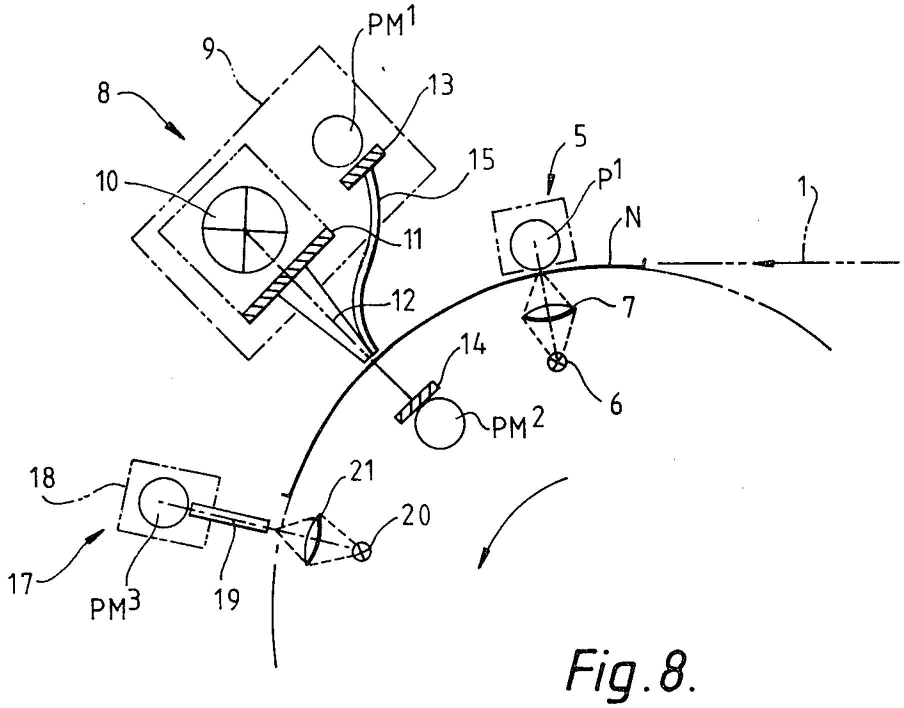
FIG. 8 is a view similar to that of FIG. 1, showing the measurement of the transmittance of UV radiation by the sheet.

In FIG. 8, the position of the photomultiplier $PM^2$ and its associated filter 14 differs from its position in FIG. 1 in that it is located to measure the transmittance of ultraviolet radiation by the sheet, and thereby the absorption of ultraviolet radiation by the sheet.

Figure 9:
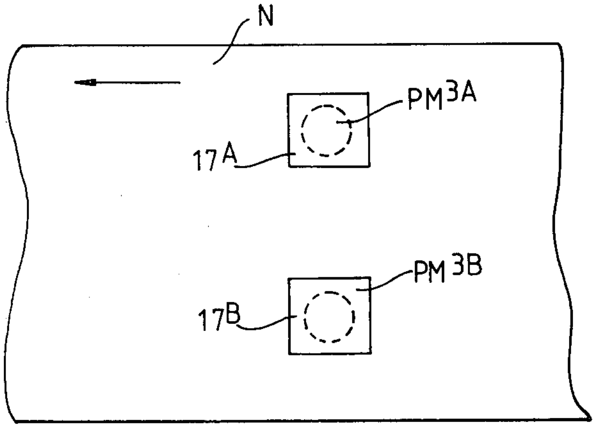
FIG. 9 illustrates the measurement of visible light transmission along parallel paths on the sheet.

In FIG. 9, two photomultipliers PM3A and PM3B are shown in detectors 17A and 17B positioned over the sheet N; the elements 19, 20 and 21 are similarly duplicated, under the detectors 17A and 17B to permit the measurement of the transmittance of visible light by the two detectors scanning the sheet along parallel lines.

In one test, simulated watermarks were prepared by printing the watermark design in some cases with opacifying ink only, in others with transparentizing ink only, and in still others with both of these inks. The simulated watermarks were printed on both commercially available UV-bright paper and on UV-dull banknote paper. These documents were randomly mixed with unprinted documents of both UV-bright and UV-dull papers together with documents containing mould watermarks. The controls were adjusted to reject documents in which the UV-reflectance of the watermark area was greater or less than that of the base paper. The notes printed with the simulated watermarks were reliably rejected from the remaining documents with and without mould watermarks.

In tests on the transmission characteristics, on an arbitrary scale the unwatermarked paper was found to have a maximum variation of plus or minus 10% transmittance (using a scanning densitometer with a quartz light source and a closely coupled light guide of 1 mm diameter), whereas a typical watermark was found to show variations ranging from $-50\%$ to $+20\%$ transmittance.

In a further test, samples of commercially available UV-bright paper and samples of a typically UV-dull banknote paper (without a watermark) were separated reliably by the output of the photomultiplier $PM^1$.

Figure 3:
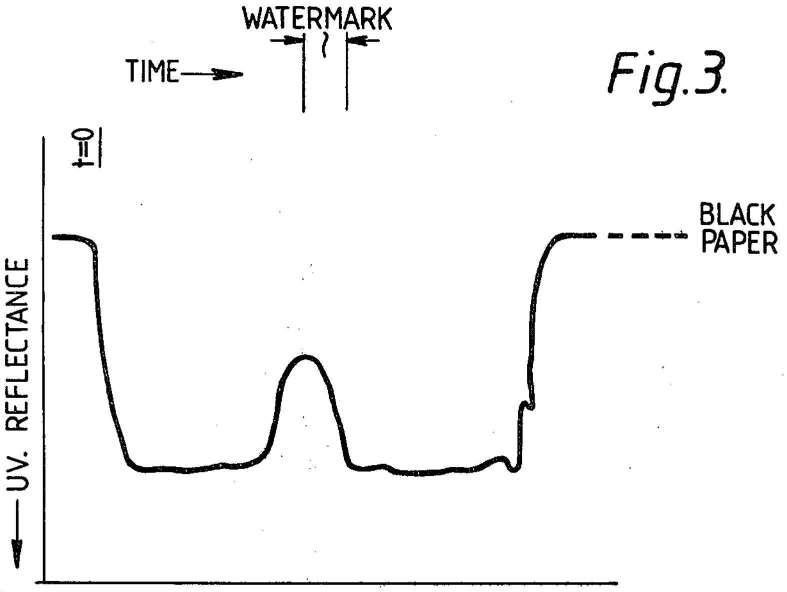
FIG. 3 is a waveform diagram obtained by measuring reflectance of ultra-violet radiation from a UV-bright paper having a printed watermark.
Figure 4:
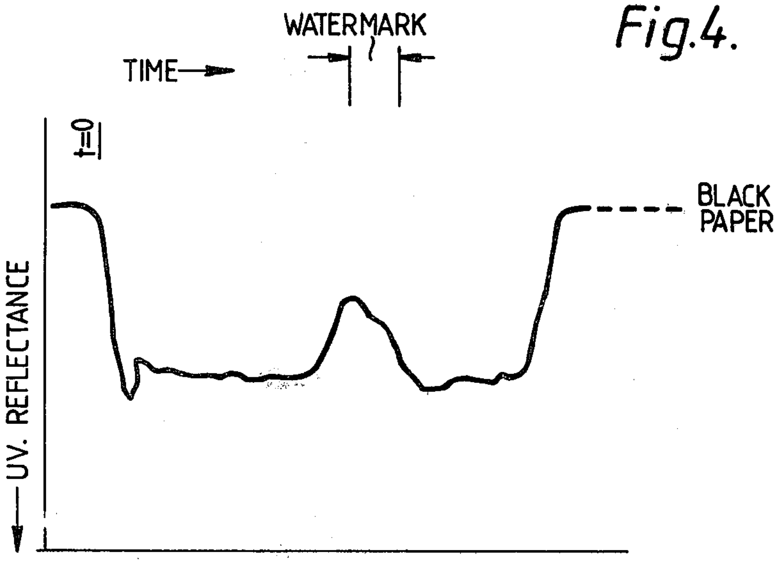
FIG. 4 is a similar waveform diagram for a UV-dull paper having a printed watermark.

FIGS. 3 and 4 are waveform diagrams illustrating the ultra-violet reflectance obtained from two documents carrying simulated watermarks, that on FIG. 3 being on UV-bright paper and that on FIG. 4 being on UV-dull paper. The traces were obtained using a 20 kHz AC lamp. As will be seen from the portions of the traces which relate to the watermarks and those portions which relate to the unwatermarked parts of the paper, the reflectance test clearly identifies the simulated watermarks.

Figure 5:
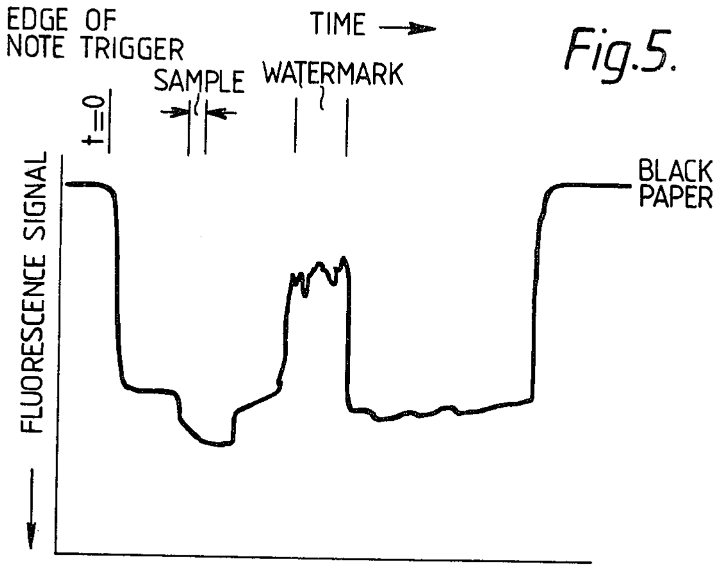
FIGS. 5 and 6 are waveform diagrams obtained by measuring the fluorescence of UV-bright and UV-dull paper, respectively, having printed watermarks in the presence of ultra-violet radiation.
Figure 6:
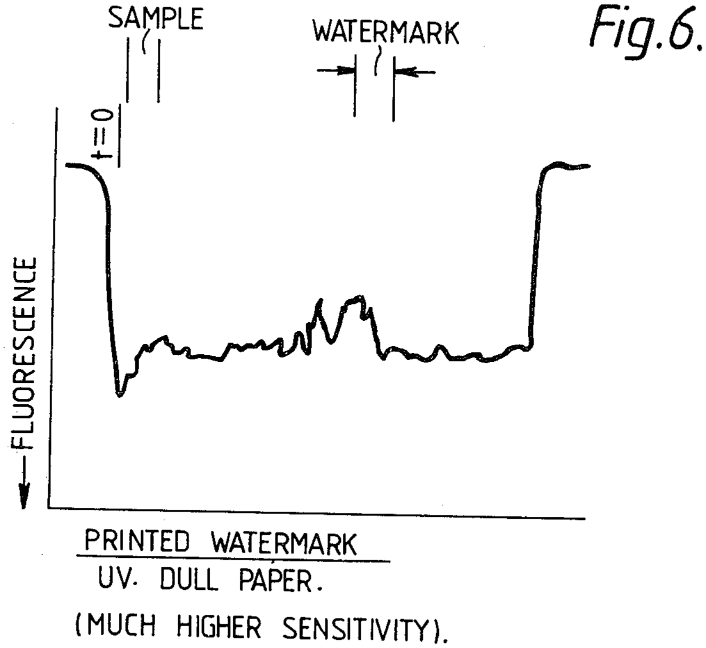

FIGS. 5 and 6 are waveform diagrams similar to those of FIGS. 3 and 4, but obtained by measuring the fluorescence derived from the sheets with the simulated watermarks in the presence of ultra-violet radiation. Again, the positions of the simulated watermarks are clearly identified in the traces.

We claim:

1. A method of rejecting sheets which do not have a mould watermark (as herein defined), comprising the steps of:

measuring for each sheet, in an area in which a watermark is expected to be present, the absorption of ultraviolet radiation by the sheet;

measuring for each sheet, in the area in which a watermark is expected to be present, the transmittance of visible light by the sheet;

and rejecting sheets for which the said absorption measurement does not show a substantially constant value and also sheets for which the said transmittance measurement shows a substantially constant transmittance of visible light over the said area.

2. A method in accordance with claim 1, in which the measurement of the absorption of ultra-violet radiation is effected by measuring the reflectance of ultra-violet radiation by the sheet.

3. A method in accordance with claim 1, in which the measurement of ultra-violet absorption is effected by measuring the transmittance of ultra-violet radiation by the sheet.

4. A method in accordance with claim 1, in which the measurement of ultra-violet absorption is effected by measuring the fluorescence of the sheet in the presence of ultra-violet radiation.

5. A method in accordance with any one of claims 1 to 4, further comprising measuring the fluorescence of the sheet material in the presence of ultra-violet radiation outside the area in which the watermark is expected to be present, and rejecting the sheet if the said fluorescence measurement is greater than a predetermined value.

6. A method in accordance with any one of claims 1 to 4, in which the measurement of the transmittance of visible light is effected by at least two detectors scanning the sheet along parallel lines.

7. A method in accordance with any one of claims 1 to 4, in which for each sheet reference values for the absorption of ultra-violet radiation and for the transmittance of light are obtained by measuring these characteristics of a portion of the sheet other than the area in which the watermark is expected to be found.

8. A method in accordance with claim 2, in which two measurements of ultra-violet reflectance are made, one from each side of the sheet.

9. A method in accordance with claim 4, in which two measurements of the fluorescence of the sheet induced by ultra-violet radiation are made, one from each side of the sheet.

10. Apparatus for examining sheets passing along a flow line and generating a reject signal in response to the passage of a sheet which does not have a mould watermark (as herein defined), comprising a source of ultra-violet radiation arranged to direct such radiation into the path of each sheet, means for measuring the absorption of the ultra-violet radiation of each sheet in an area of the sheet in which a watermark is expected to be present, means for comparing the measured absorption value with a reference value, means for measuring the transmittance of the said area of each sheet to visible light, means for comparing the light-transmittance value with a reference value, and means for rejecting sheets for which the said absorption measurement does not have a substantially constant relationship to the said reference value and also sheets for which the said light transmittance measurement has a substantially constant relationship to the transmittance reference value.

11. Apparatus in accordance with claim 10, in which the means for measuring the absorption of ultra-violet radiation comprises means for measuring the reflectance of the ultra-violet radiation by the sheet.

12. Apparatus in accordance with claim 10, in which the means for measuring the absorption of ultra-violet radiation comprises means for measuring the transmittance of ultra-violet radiation by the sheet.

13. Apparatus in accordance with claim 10, in which the means for measuring the absorption of ultra-violet radiation comprises means for measuring the fluorescence of the sheet induced by the ultra-violet radiation.

14. Apparatus in accordance with any one of claims 10 to 13, further comprising means for measuring the fluorescence of the sheet material outside the area in which the watermark is expected to be present in response to the ultra-violet radiation and means for comparing this fluorescence value with a preset reference value, the rejecting means further rejecting sheets for which this fluorescence value exceeds a preset reference value.

15. Apparatus in accordance with any one of claims 10 to 13, in which the rejecting means comprises a diverter in the said flow path downstream of the measuring means, the rejecting means acting to operate the diverter to sort rejected sheets from the remaining sheets.

16. Apparatus in accordance with claim 10, further comprising signal generating means for detecting the presence of a predetermined point of each sheet at a given point in the flow line, delay means for rendering the absorption and transmittance measuring means operative to respond to the said area of each sheet in which the watermark is expected to be present, and timing means for maintaining the said measuring means operative for a period determined by the expected length of the watermark in the scanning direction.

17. Apparatus in accordance with claim 16, further including delay means for rendering the absorption and transmittance measuring means operative to respond to an area of each sheet other than that in which the watermark is expected to be present, to obtain reference absorption and transmittance values for the sheet.

18. Apparatus in accordance with claim 11, comprising two means for measuring the reflectance of ultra-violet radiation by each sheet, one on each side of the sheet.

19. Apparatus in accordance with claim 13, comprising two means for measuring the fluorescence of each sheet induced by ultra-violet radiation, one on each side of the sheet.

* * * * *